(12) United States Patent
Fukami (10) Patent No.: US 6,709,071 B2
(45) Date of Patent: Mar. 23, 2004

(54) VEHICLE MOTION CONTROL DEVICE WITH THROTTLE OPENING AMOUNT ADJUSTMENT

(75) Inventor: Masanobu Fukami, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/156,080

(22) Filed: May 29, 2002

(65) Prior Publication Data

US 2002/0185912 A1 Dec. 12, 2002

(30) Foreign Application Priority Data

May 29, 2001 (JP) ........................................ 2001-160470

(51) Int. Cl.[7] ................................................ B60T 8/44
(52) U.S. Cl. ................................. 303/113.3; 303/114.3
(58) Field of Search ........................... 303/113.2, 113.3, 303/114.3, 139, 140, 141, 142, 144, 146, 147, 148, 149, 145

(56) References Cited

U.S. PATENT DOCUMENTS 5,248,189 A * 9/1993 Izumi et al. .............. 303/113.3
6,039,411 A * 3/2000 Tozu et al. ............... 303/116.1
6,390,568 B1 * 5/2002 Tozu et al. ............... 303/114.3
6,398,316 B1 * 6/2002 Mizutani et al. ......... 303/114.3

FOREIGN PATENT DOCUMENTS

JP          7-304436 A        11/1995

* cited by examiner

Primary Examiner—Matthew C. Graham
(74) Attorney, Agent, or Firm—Burns, Doane, Swecker & Mathis, L.L.P.

(57) ABSTRACT

A vehicle motion control device includes a throttle opening amount automatic adjusting device for adjusting automatically the opening amount of the engine throttle valve irrespective of accelerator pedal operation, a control device for performing an automatic pressure increase control to the wheel cylinder at least during a non-operating condition of the brake pedal and for controlling the throttle opening amount automatic adjusting device, an intake vacuum pressure decrease condition detecting device for detecting a decrease condition of the intake vacuum pressure, and a counter for counting the number of times the automatic pressure increase control is performed under the intake vacuum pressure decrease condition. The control device corrects the throttle opening amount at the automatic pressure increase control to decrease based on the number of time the automatic pressure increase control is performed.

3 Claims, 9 Drawing Sheets

S301: Vacuum pressure decrease
S302: Change traction control from end to start
S304: Change brake steering control from end to start

Fig. 8

S401: Traction control Brake steering
Control under control

Fig. 9

VEHICLE MOTION CONTROL DEVICE WITH THROTTLE OPENING AMOUNT ADJUSTMENT

CROSS REFERENCE TO RELATED APPLICATIONS

This application is based on and claims priority under 35 U.S.C. § 119 with respect to a Japanese Patent Application 2001-160470, filed on May 29, 2001, the entire content of which is incorporated herein by reference.

FIELD OF THE INVENTION

This invention relates to a vehicle motion control device which is applicable to a brake steering control device, a traction control device and so on.

BACKGROUND OF THE INVENTION

A Japanese Patent Laid-Open Publication No. 7-304436 discloses a vehicle motion control device of this kind. This known device includes a wheel cylinder equipped on a vehicle wheel, an automatic hydraulic pressure generator generating a brake hydraulic pressure irrespective of the operation of a brake pedal by using an intake vacuum pressure of an engine of a vehicle, a hydraulic pressure control valve disposed between the wheel cylinder and the automatic hydraulic pressure generator, a throttle opening amount automatic adjusting means for adjusting automatically the opening amount of a throttle valve of the engine irrespective of the operation of an accelerator pedal of the vehicle and control means for controlling the automatic hydraulic pressure generator and the hydraulic pressure control valve in accordance with a running condition of the vehicle and for performing an automatic pressure increase control to the wheel cylinder at least when the brake pedal is not operated. Further, the control means controls the throttle opening amount automatic adjusting means in accordance with the running condition of the vehicle and performs an opening amount automatic adjust control to the wheel cylinder.

In the vehicle motion control device of this kind, when the automatic pressure Increase control is performed intermittently at relative shorter intervals, the vacuum pressure in the automatic hydraulic pressure generator is dissipated excessively and is decreased. As a result, the brake hydraulic pressure which the automatic hydraulic pressure generator can generate is decreased and the performance of the vehicle motion control device decreases. Further, a brake operational force which is required for normal braking is increased.

A need thus exists for a vehicle motion control device which lessens the decrease of the vacuum pressure in the automatic hydraulic pressure generator when the automatic pressure increase control is performed intermittently at relative shorter intervals.

SUMMARY OF THE INVENTION

In light of the foregoing, the present invention provides a vehicle motion control device which includes a wheel cylinder equipped on a vehicle wheel; an automatic hydraulic pressure generator generating a brake hydraulic pressure irrespective of the operation of a brake pedal by using an intake vacuum pressure of an engine of a vehicle; a hydraulic pressure control valve disposed between the wheel cylinder and the automatic hydraulic pressure generator; a throttle opening amount automatic adjusting means for adjusting automatically the opening amount of a throttle valve of the engine irrespective of the operation of an accelerator pedal of the vehicle; control means for controlling the automatic hydraulic pressure generator and the hydraulic pressure control valve in accordance with a running condition of the vehicle and for performing an automatic pressure increase control to the wheel cylinder at least non-operating condition of the brake pedal, the control means for controlling the throttle opening amount automatic adjusting means in accordance with the running condition of the vehicle and for performing an opening amount automatic adjust control to the wheel cylinder; intake vacuum pressure decrease condition detecting means for detecting a decrease condition of the intake vacuum pressure; and counter means for counting the number of performance of the automatic pressure increase control performed under the intake vacuum pressure decrease condition detected by the intake vacuum pressure decrease condition detecting means, wherein the control means corrects the throttle opening amount requested to the throttle opening amount automatic adjusting means at the automatic pressure increase control so as to decrease in accordance with the number of performance of the automatic pressure increase control counted by the counter means.

BRIEF DESCRIPTION OF THE DRAWING FIGURES

A more complete appreciation of the invention and other advantages thereof will be readily obtained as the same becomes better understood by reference to the following detailed description when considered in connection with the accompanying drawings, in which.

DETAILED DESCRIPTION OF THE INVENTION

Having generally described the present invention, a further understanding of the invention can be obtained now according to an embodiment of the present invention with reference to FIGS. 1 to 9 in accompanying drawings.

Figure 1:
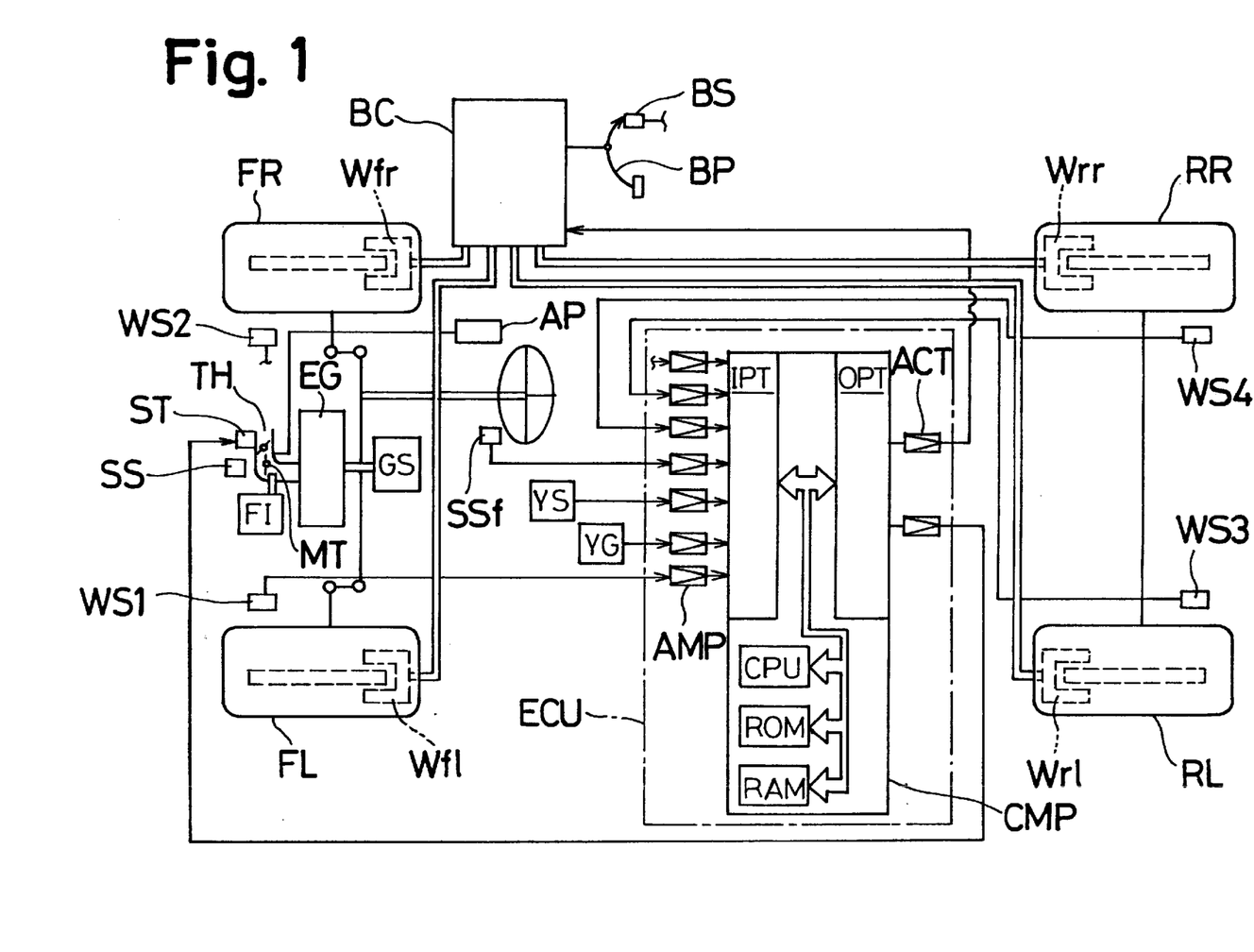
FIG. 1 is an overview of a vehicle motion control device according to an embodiment of the present invention.

Referring to FIG. 1, an engine EG of a vehicle includes a throttle control device TH and a fuel injection device FI. In the throttle control device TH, a main throttle opening amount of a main throttle valve MT is controlled in response to the operation of an accelerator pedal AP. Further, in response to an output of an electronic control unit ECU, a sub throttle valve ST is moved and a sub throttle opening amount is controlled, and further an amount of fuel injection is controlled by the fuel injection device FI. In this embodiment, the engine EG is connected to front wheels FL, FR through a transmission device GS.

Wheel cylinders Wfl, Wfr, Wrl and Wrr are equipped on wheels FL, FR, RL and RR and are connected to a brake hydraulic pressure control device BC. The wheel FL corresponds to a wheel which is located at front left side of the vehicle. Likewise, the wheel FR corresponds to a wheel on front right side, the wheel RL corresponds to a wheel on rear left side, and the wheel RR corresponds to a wheel on rear right side.

Wheel speed sensors WS1, WS2, WS3 and WS4 are provided on the wheels FL, FR, RL and RR and are connected to the electronic control unit ECU. Rotational speed of each wheel, that is a pulse signal with pulse number proportional to a wheel speed is inputted into the electronic control unit ECU. Further, sensors such as a brake switch BS for detecting the operation of a brake pedal BP, a front wheel steering sensor SSf for detecting a steering angle δ f of the front wheels FL, FR, a lateral G sensor YG for detecting a lateral acceleration of the vehicle, a yaw rate sensor YS for detecting a yaw rate and a throttle sensor SS for detecting the opening amounts of the main throttle valve MT and the sub throttle valve ST are connected to the electronic control unit ECU. According to the yaw rate sensor YS, a change speed of vehicle yaw angle about the vehicle axis on the vehicle center of gravity, that is yaw angular velocity (i.e., yaw rate) is detected to be outputted as an actual yaw rate Y to the electronic control unit ECU.

As shown in FIG. 1, the electronic control unit ECU includes a microcomputer CMP which includes a processing unit CPU, memories ROM, RAM, and input ports IPT and output ports OPT all of which are interconnected via a bus. Output signals from the wheel speed sensors WS1–WS4, the brake switch BS, the front wheel steering angle sensor SSf, the yaw rate sensor YS, the lateral G sensor YG and the throttle sensor SS are inputted from the Input ports IPT to the processing unit CPU via an amplifier circuit AMP. The control signals are outputted from the output ports OPT to the throttle control device TH and the brake hydraulic pressure control device BC.

In the microcomputer CMP, the memory ROM memorizes programs regading various transactions including flowcharts shown in FIGS. 4 to 8, the processing unit CPU carries out the program while an ignition switch (not shown) is closed, and the memory RAM tentatively memorizes a parameter data which is required for carrying out the program.

Figure 2:
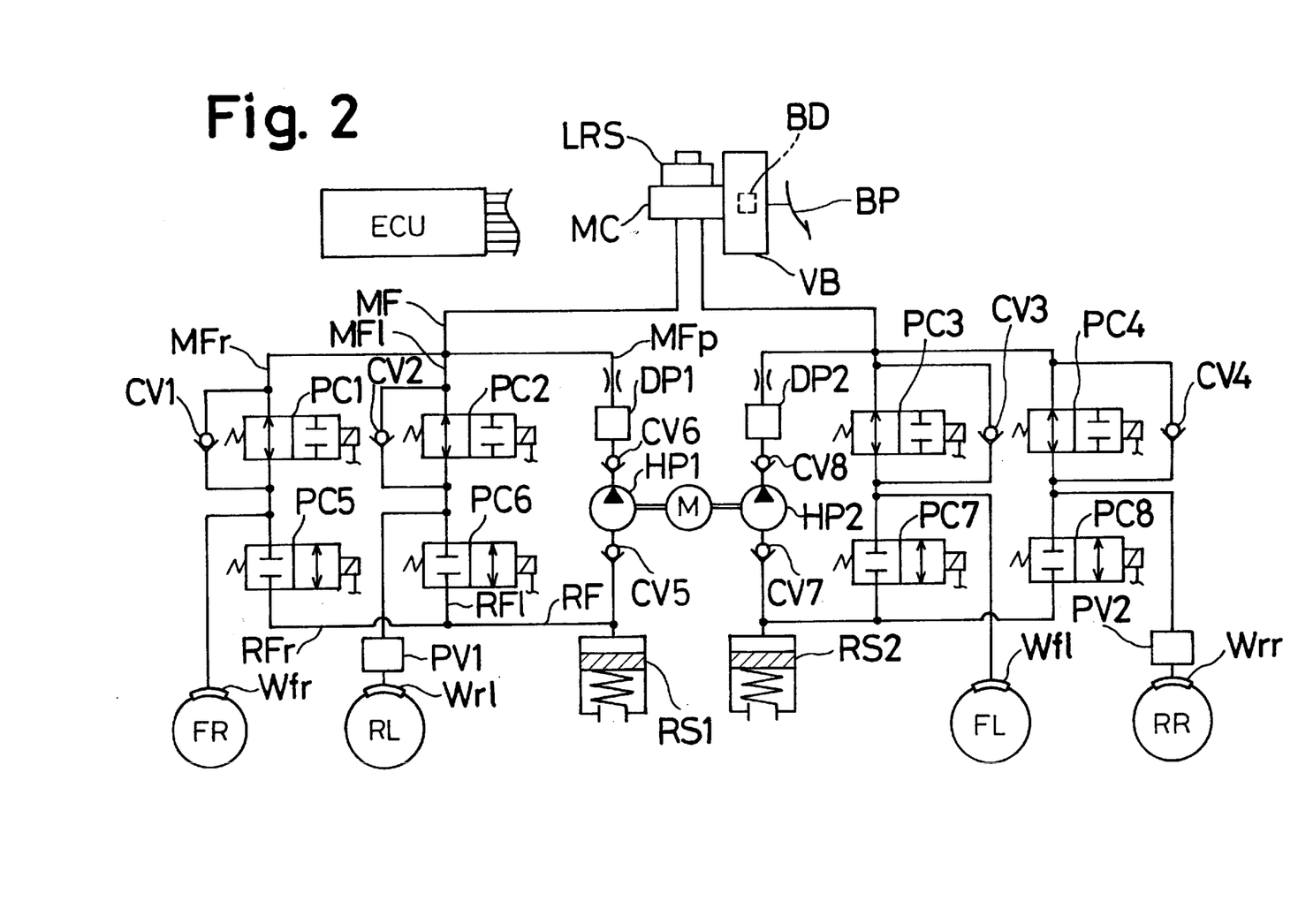
FIG. 2 is a schematic illustration of a brake system according to the embodiment of the present invention.

Next, a brake system including the brake hydraulic pressure control device BC will be explained as follows. As shown in FIG. 2, a master cylinder MC is boosted via a vacuum booster VB in accordance with the operation of the brake pedal BP. A pressure of a brake fluid which is supplied from a master cylinder reservoir LRS into the master cylinder MC is increased to output a master cylinder hydraulic pressure to two brake hydraulic pressure systems of the wheels FR, RL side and the wheels FL, RR side respectively. As it called X type dual circuit is provided in the vehicle motion control device of this embodiment. The master cylinder MC is a tandem type master cylinder having two pressure chambers. A first pressure chamber is in communication with the brake hydraulic pressure system on the wheels FR, RL side, and a second pressure chamber is in communication with the brake hydraulic pressure system on the wheels FL, RR.

Regarding the brake hydraulic pressure system on the wheels FR, RL side, the first pressure chamber of the master cylinder MC is connected to the wheel cylinders Wfr, Wrl via a main hydraulic pressure conduit MF and branch hydraulic pressure conduits MFr, MFl respectively. The branch hydraulic pressure conduits MFr, MFl are provided with normal-open type two-port two-position solenoid valves PC1 and PC2 (hereinafter referred as the solenoid valves PC1 and PC2) respectively. Check valves CV1 and CV2 are provided in parallel with the solenoid valves PC1 and PC2 respectively. The check valves CV1 and CV2 allow the flow of the brake fluid in the direction only toward the master cylinder MC. The brake fluid in the wheel cylinders Wfr, Wrl is returned to the master cylinder MC and eventually to the master cylinder reservoir LRS via the check valves CV1 and CV2. Accordingly, when the brake pedal BP is released, the hydraulic pressure in the wheel cylinders Wfr, Wrl promptly follows the decrease of the hydraulic pressure of the master cylinder MC side. Normal closed type two-port two-position solenoid valves PC5 and PC6 (hereinafter referred as the solenoid valves PC5 and PC6) are provided on output side branch pressure conduits RFr, RFl which are in communication with the wheel cylinders Wfr, Wrl. An output hydraulic pressure conduit RF confluent with the branch hydraulic pressure conduits RFr, RFl is connected with an auxiliary reservoir RS1.

A hydraulic pressure pump HP1 is interposed in a hydraulic pressure conduit MFp which is in communication with the branch hydraulic pressure conduits MFr, MFl at upper stream side of the solenoid valves PC1 and PC2. The auxiliary reservoir RS1 is connected with an inlet side of the hydraulic pressure pump HP1 via a check valve CV5. An outlet side of the hydraulic pressure pump HP1 is connected to the upper stream side of the solenoid valves PC1 and PC2 via a check valve CV6. The hydraulic pressure pump HP1 is actuated by a single electric motor M along with a hydraulic pressure pump HP2 for sucking the brake fluid from the auxiliary reservoir RS1 to return to the outlet side. The auxiliary reservoir RS1 is provided independently from the master cylinder reservoir LRS. The auxiliary reservoir RS1 may also be called an accumulator which includes a piston and a spring for preserving a predetermined volume of the brake fluid. The check valves CV5 and CV6 function as an inlet valve and an outlet valve for restricting the flow of the brake fluid outputted via the hydraulic pressure pump HP1 in a fixed direction. The check valves CV5 and CV6 are unitary structured in the hydraulic pressure pump HP1. A damper DP1 is provided on the outlet side of the hydraulic pressure pump HP1. A proportioning valve PV1 is disposed in a hydraulic pressure conduit which is connected to the wheel cylinder Wrl on the rear wheel side.

Likewise, normal open type two-port two-position solenoid valves PC3 and PC4, normal closed type two-port two-position solenoid valves PC7 and PC8, check valves CV3, CV4, CV7 and CV8, an auxiliary reservoir RS2, a damper DP2, and a proportioning PV2 are provided in the brake hydraulic pressure system on the wheels FL, RR side. As mentioned above, the hydraulic pressure pump HP2 is actuated by the electric motor M along with the hydraulic pressure pump HP1. The solenoid valves PC1–PC8 for changing the brake hydraulic pressure of the wheel cylinders of the respective wheels correspond to the hydraulic pressure control valves of the present invention.

Figure 3:
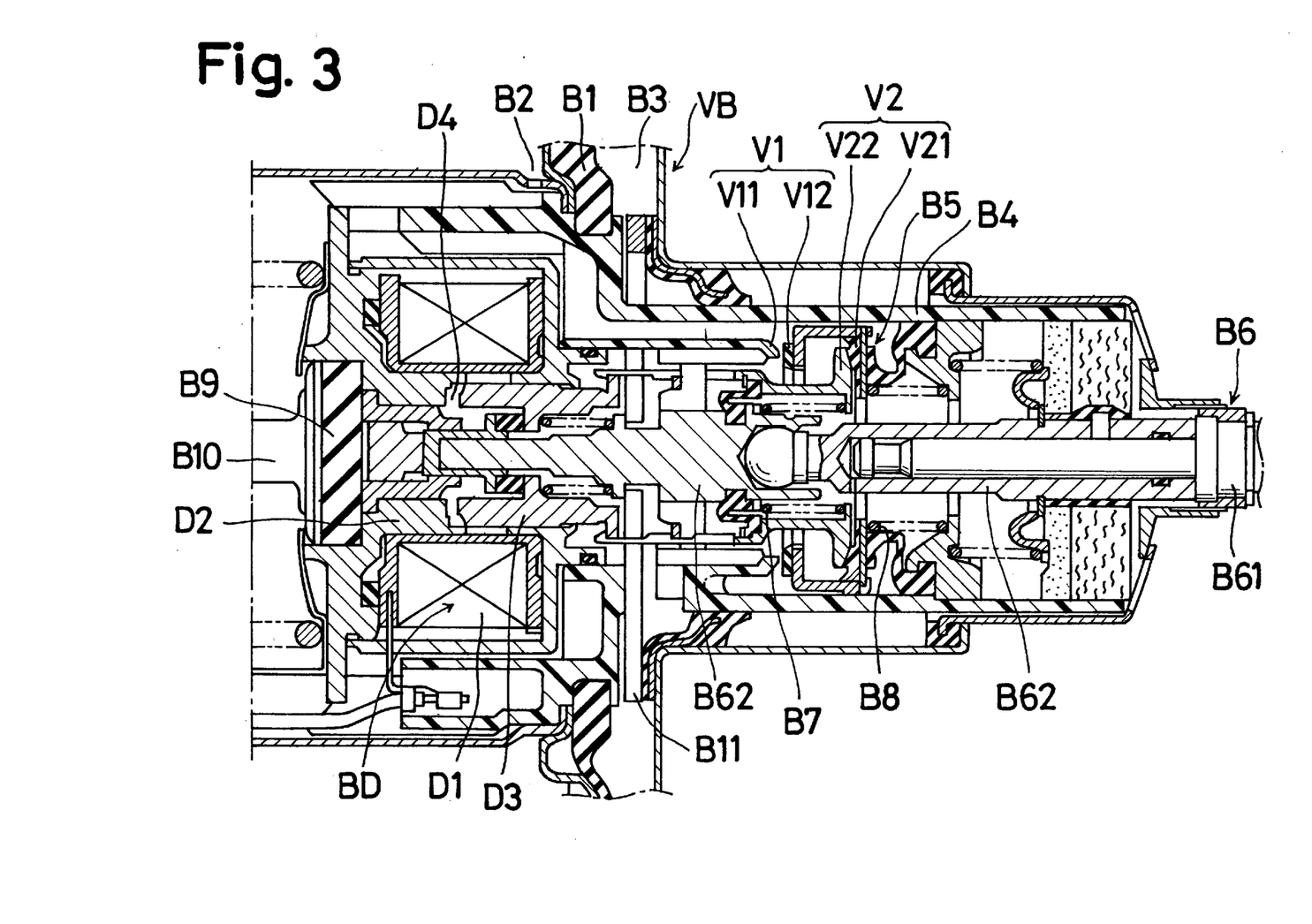
FIG. 3 is a partial cross-sectional view of a vacuum booster according to the embodiment of the present invention.

As shown in FIG. 3, the vacuum booster VB includes a booster actuator BD for automatically actuating the vacuum booster VB irrespective of the operation of the brake pedal (i.e., at least when the brake pedal BP is not operated).

Known structure of the vacuum booster VB is employed in the vehicle motion control device according to this embodiment. A constant pressure chamber B2 and a variable pressure chamber B3 are formed by a movable wall B1. The movable wall B1 is unitary connected to a power piston B4. The constant pressure chamber B2 is always in communication with an intake manifold (not shown) of the engine EG to be introduced with the vacuum pressure. The power piston B4 is operatively connected to an output rod B10 for transmitting the power via a fixed core D2 and a reaction disc B9. The output rod B10 is connected to the master cylinder MC.

A valve mechanism B5 including a vacuum valve V1 for establishing and interrupting the fluid communication between the constant pressure chamber B2 and the variable pressure chamber B3 and an air valve V2 for establishing and interrupting the fluid communication between the variable pressure chamber B3 and the atmosphere is provided in the power piston B4. The vacuum valve V1 includes an annular valve seat V11 formed on the power piston B4 and an elastic valve body V12 which is detachable to the valve seat V11. The air valve V2 includes an elastic valve seat V21 equipped to the elastic valve body V12 and a valve body V22 which is detachable to the elastic valve seat V21. The valve body V22 is connected to an input rod B6 which is operatively connected to the brake pedal BP. The valve body V22 is biased in the direction to be seated on the elastic valve seat 21 by the biasing force of a spring B7. The elastic valve body V12 of the vacuum valve V1 is biased in the direction to be seated on the annular valve seat V11 by the biasing force of a spring B8. The biasing force of the spring B8 also biases the elastic valve seat V21 of the air valve V2 in the direction to be seated on the Valve body V22.

Accordingly, the vacuum valve V1 and the air valve V2 of the valve mechanism B5 are opened and closed in accordance with the operational force of the brake pedal BP to generate the pressure difference between the constant pressure chamber B2 and the variable pressure chamber B3. Thus, the output force amplified by the operation of the brake pedal BP is transmitted to the master cylinder MC.

The booster actuator BD includes a linear solenoid D1, the fixed core D2, and a movable core D3. The linear solenoid D1 which is connected to the electronic control unit ECU attracts the movable core D3 towards the fixed core D2 when energized, The attraction force of the linear solenoid D1 is varied in accordance with the actuating electric current. The fixed core D2 is disposed between the power piston B4 and the reaction disc B9 for transmitting the force from the power piston B4 to the reaction disc B9. The movable core D3 is positioned opposing to the fixed core D2 in the linear solenoid D1 and thus a magnetic gap D4 is formed between the movable core D3 and the fixed core D2. The movable core D3 is engaged with the valve body V22 of the air valve V2. By attracting the movable core D3 relative to the fixed core D2 in the direction to reduce the magnetic gap D4, the valve body V22 of the air valve V2 can be unitary moved.

The input rod B6 includes a first input rod B61 and a second input rod B62. The first input rod B61 is unitary connected to the brake pedal BP. The second input rod B62 is movable relative to the first input rod B61 for transmitting the force to the output rod B10 via the key member B11 by the power piston B4. Accordingly, when only the second input rod B62 is actuated to forward, the first input rod B61 is left behind. The first and the second input rods B61, B62 structure a mechanism for leaving a pedal behind.

The master cylinder MC, the vacuum booster VB, and the booster actuator BD correspond to an automatic hydraulic pressure generator of the present invention. The operation of the booster actuator BD and the vacuum booster VB when performing the automatic pressure increase control (e.g., brake steering control and traction control) for automatically pressurizing the wheel cylinders of the wheels to be controlled at least when the brake pedal is not operated will be explained as follows.

When it is determined that the automatic pressure increase control is required by the electronic control unit ECU, the linear solenoid D1 is energized, the movable core D3 is moved towards the magnetic gap D4 side, and the valve body V22 of the air valve V2 is unitary moved with the movable core B3 against the biasing force of the spring B7. Accordingly, the elastic valve body V12 of the vacuum valve V1 is seated on the annular valve seat V11 for interrupting the fluid communication between the variable pressure chamber B3 and the constant pressure chamber B1. then because the valve body V22 of the air valve V2 is further moved, the valve body V22 is separated from the elastic valve seat V21 and the atmosphere is introduced into the variable pressure chamber B3. Accordingly, the pressure difference is generated between the variable pressure chamber B3 and the constant pressure chamber B1 so the power piston B4, the fixed core D1, the reaction disc B9, and the output rod B10 towards the master cylinder side. Thus, the master cylinder MC automatically generates the hydraulic pressure.

After the power piston B4 is engaged with the key member B11, the second input rod B62 engaged with the key member B11 is unitary moved forwardly with the power piston B4. On the other hand, since the forwarding force of the power piston B4 is not transmitted to the first input rod B61, the first input rod B61 is maintained at an initial position. That is, when the booster actuator BD automatically actuates the vacuum booster VB, the brake pedal BP is maintained at the initial position.

Figure 4:
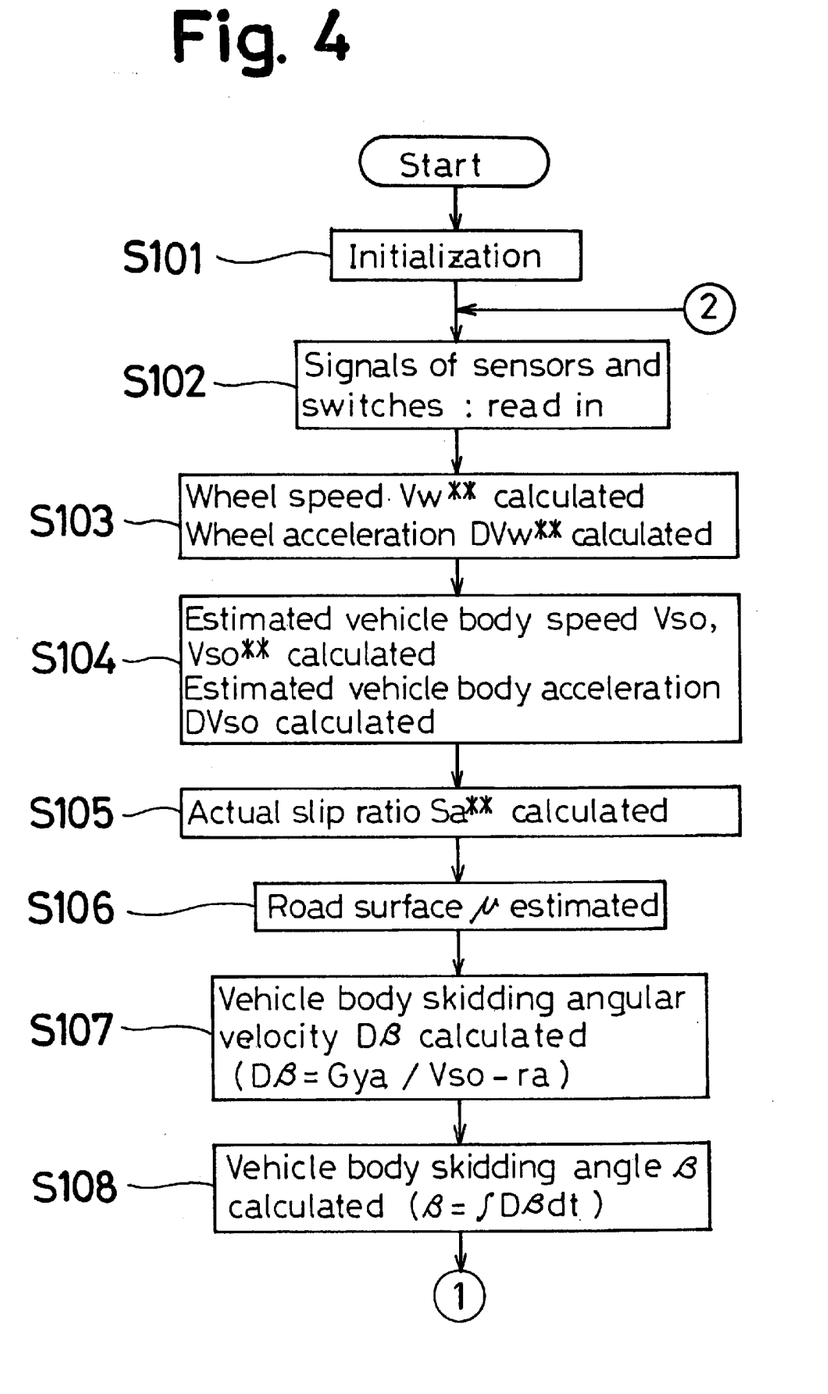
FIG. 4 is a flowchart showing a flow of a motion control according to the embodiment of the present invention.
Figure 5:
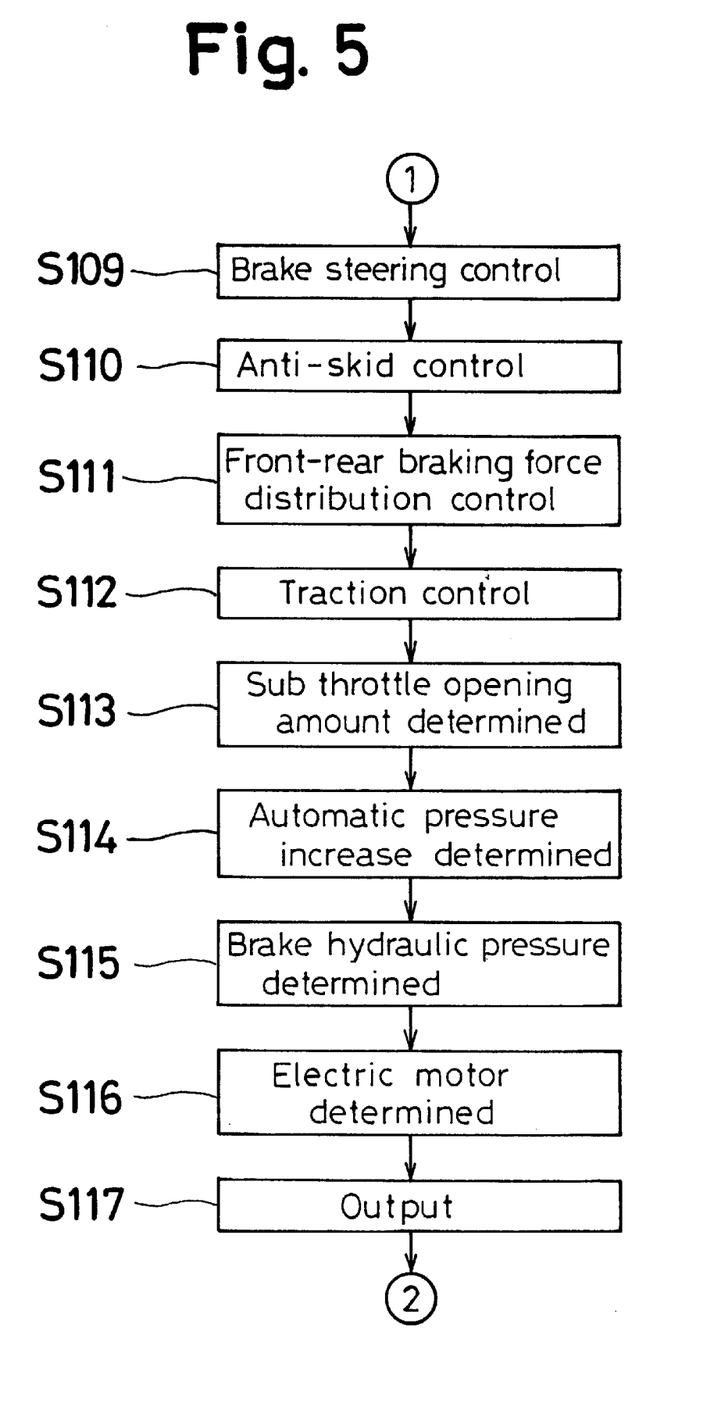
FIG. 5 is a flowchart showing a flow of the motion control according to the present invention.

The booster actuator BD, the solenoid valves PC1-PC8, and the electric motor M are actuated by the electronic control unit ECU for performing the brake steering control (i.e., over steer control or under steer control). When the ignition switch (not shown) is closed, a program for vehicle motion control according to the flowcharts of FIGS. 4 and 5 is carried out with calculation period of 6 ms.

In Step S101, the microcomputer CMP is initialized to clear various calculated value. In Step S102, detection signals of the wheel speed sensors WS1–WS4, a detection signal (i.e., the steering angle δ f) of the front wheel steering angle sensor SSf, a detection signal (i.e., the actual yaw rate Y a) of the yaw rate sensor YS, a detection signal (i.e., actual lateral acceleration Gya) of the lateral acceleration sensor YG, and a detection signal of the throttle sensor SS are read in.

Next, in Step S103, a wheel speed Vw of each wheel is calculated and a wheel acceleration DVw of each wheel is calculated by differentiating wheel speed Vw of each wheel. In Step S104, a maximum value of wheel speed Vw of each wheel is calculated as an estimated vehicle body speed Vso at the gravitational center position of the vehicle (Vso=MAX(Vw)). Then, an estimated vehicle body speed Vso at each wheel is obtained on the basis of the wheel speed Vw of each wheel. If necessary, the normalization of each estimated vehicle body speed Vso is performed in order to reduce the error due to wheel speed difference between inner wheels and outer wheels when the vehicle is turning. Further, the estimated vehicle body speed Vso is differentiated and an estimated vehicle acceleration (including an estimated vehicle body deceleration) Dvso at the gravitational center position of the vehicle is obtained.

In Step S105, an actual slip ratio Sa of each wheel is calculated as follows based on the wheel speed Vw and the estimated vehicle body speed Vso** of each wheel obtained in Step S103 and Step S104.

$$Sa = (Vso - Vw)/Vso$$

In Step S106, an approximate road surface frictional coefficient $\mu$ is estimated based on the estimated vehicle body acceleration Dvso and the detection signal Gya of the lateral acceleration sensor YG as follows.

$$\mu = (Dvso^2 + Gya^2)^{1/2}$$

In Step S107, a vehicle body skidding angular velocity D β is obtained based on the actual lateral acceleration Gya, the actual yaw rate Y a, and estimated vehicle body speed Vso as follows.

$$D\beta = Gy/Vso - Ya$$

In Step S108, a vehicle body skidding angle β is obtained as follows.

$$\beta = \int (Gy/Vso - Ya) dt$$

In this case, the vehicle body skidding angle β corresponds to a directional angle of the vehicle relative to the running direction of the vehicle. The vehicle body slidding angular velocity D β corresponds to a differentiated value of the vehicle body skidding angle β (i.e., d β/dt).

In Step S109, a brake steering control calculation transaction is carried out to determine a target slip ratio for wheels to be brake steering controlled. In Step S110, an anti-skid control is carried out and a front-rear braking force division control is carried out in Step S111. In Step S112, a traction control is carried out. In each of the Steps S109–S112, it is judged whether conditions for starting each control are satisfied or whether conditions for ending each control is satisfied. Further, a target slip, ratio for each control is set.

In Step S113, a sub throttle opening amount is determined and an automatic pressure increase is determined in Step S114. Namely, in Step S114, an operation or non operation of the booster actuator BD is determined. In Step S115, a brake hydraulic pressure of the wheel to be controlled is determined. Namely, pressure decrease, pressure increase, or pressure hold is determined. In Step S116, an operation or non operation of the electric motor M is determined. After these determinations are outputted in Step S117, the Step S102 is performed.

Figure 6:
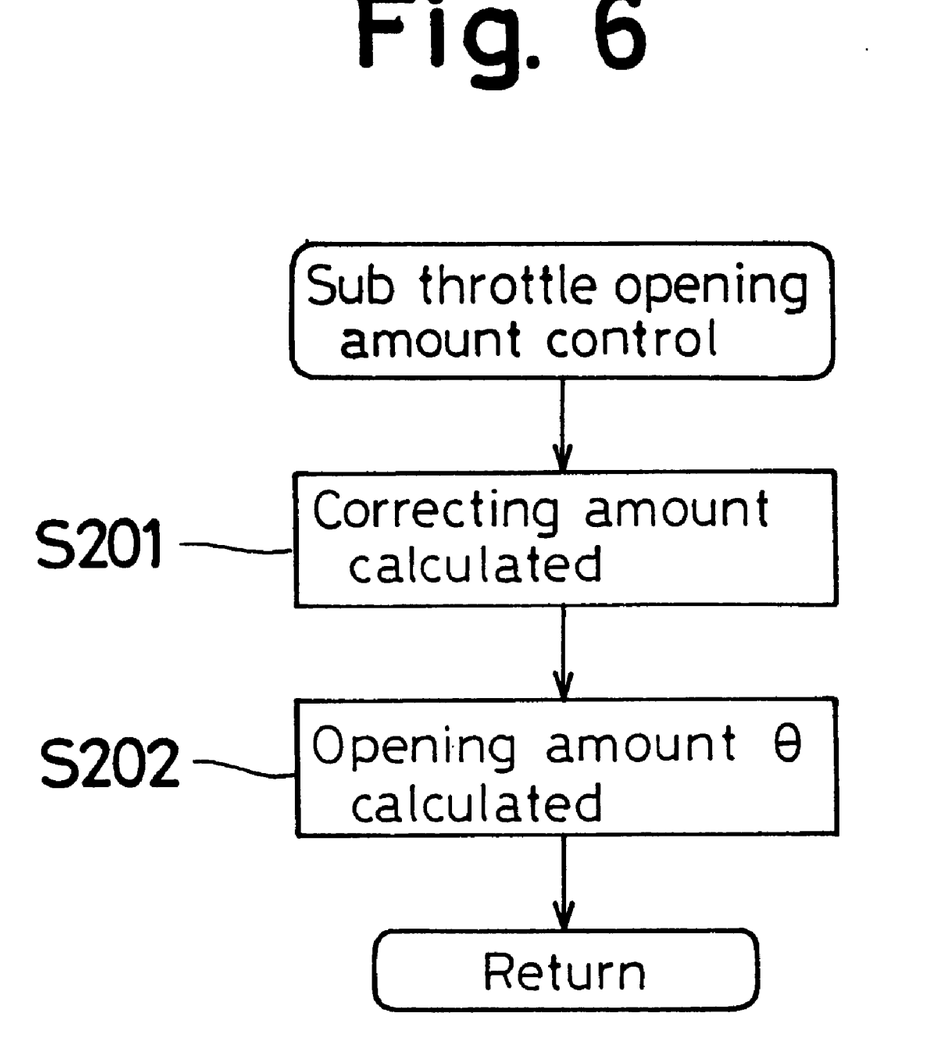
FIG. 6 is a flowchart showing details of a step S113 of FIG. 5.

FIG. 6 shows a process of the determination of the sub throttle opening amount in Step S113 of FIG. 5. In Step S201, a correcting amount θd for moving the sub throttle valve so as to decrease the opening amount is calculated. Next, in Step S202, the opening amount θ of the sub throttle valve ST is calculated and the Step S114 in FIG. 6 is performed.

Figure 7:
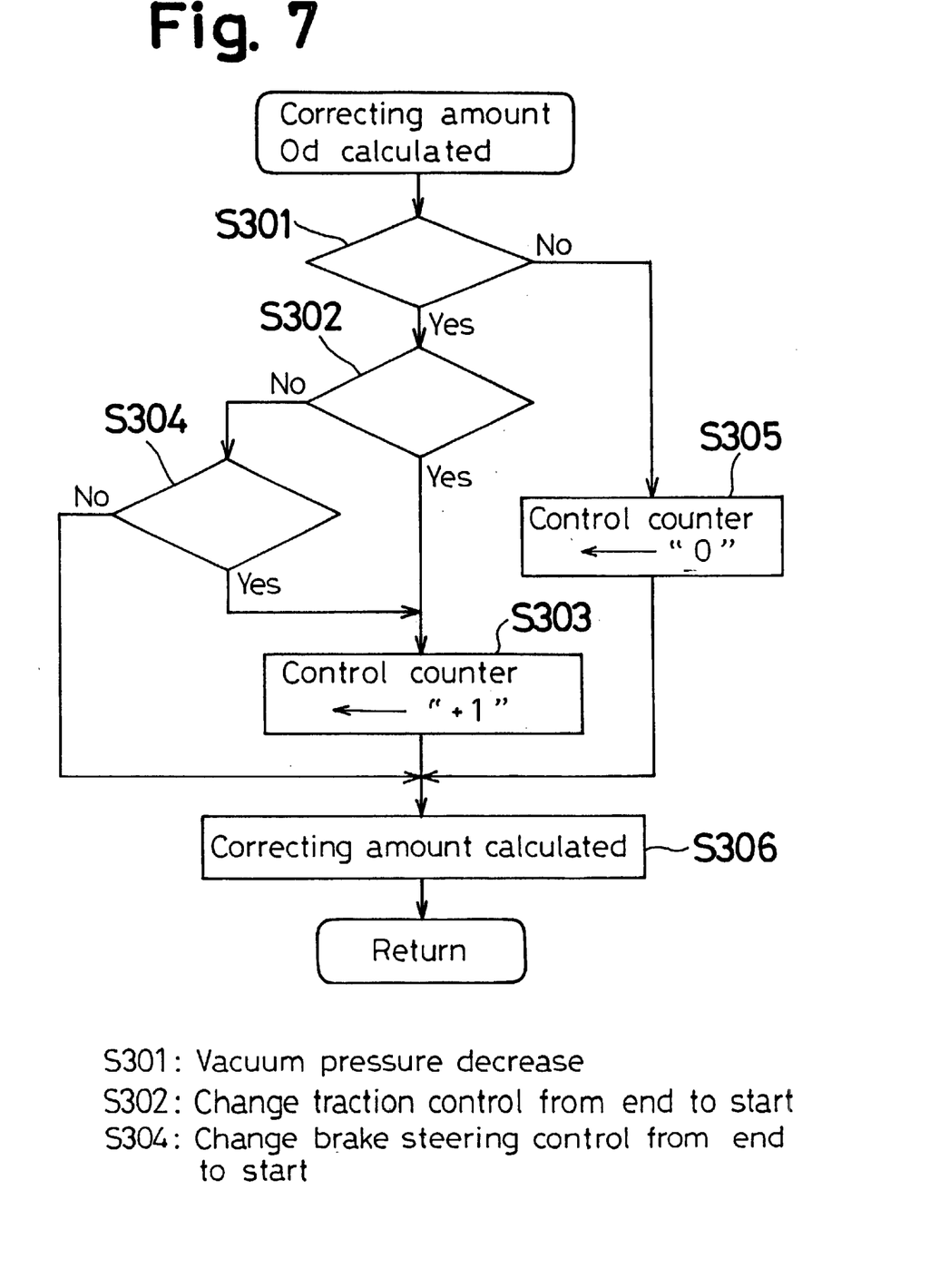
FIG. 7 is a flowchart showing details of a step S201 of FIG. 6.

FIG. 7 shows a process of the calculation of the correcting amount θd in Step S201 of FIG. 6. In Step S301, it is judged whether the condition of vacuum is in decrease condition. Namely, a main throttle opening amount detected by the throttle sensor SS is compared with a first predetermined value and a second predetermined value which is larger than the first predetermined value. When the main throttle valve opening amount is larger than the second predetermined value, it is judged that the vacuum condition is in decrease condition. When the main throttle valve opening amount is smaller than the first predetermined value, it is judged that the vacuum condition is not in decrease condition.

When the result of the judgment of the Step S301 is Yes, the Step S302 is performed and it is judged whether the state of traction control is changed from ending state to starting state. When the state of the traction control is changed, "1" is added to a discrete value of a control counter in Step S303. Then, in Step S306, the correcting amount θd is calculated and the Step S202 in FIG. 6 is performed. When the state of the traction control is not changed, it is judged whether the state of the brake steering control is changed from the ending state to starting state. When the state of the brake steering control is changed, "1" is added to a discrete value of the control counter in Step S303. When the state of the brake steering control is not changed, the correcting amount θd is calculated in Step S306. When the result of the judgment of the Step S301 is No, a discrete value of the control counter becomes "0" in Step S305 and then the correcting amount θd is calculated in Step S306. In Step S306, the correcting amount θd is calculated by multiplying a predetermined value by the discrete value of the control counter.

Figure 8:
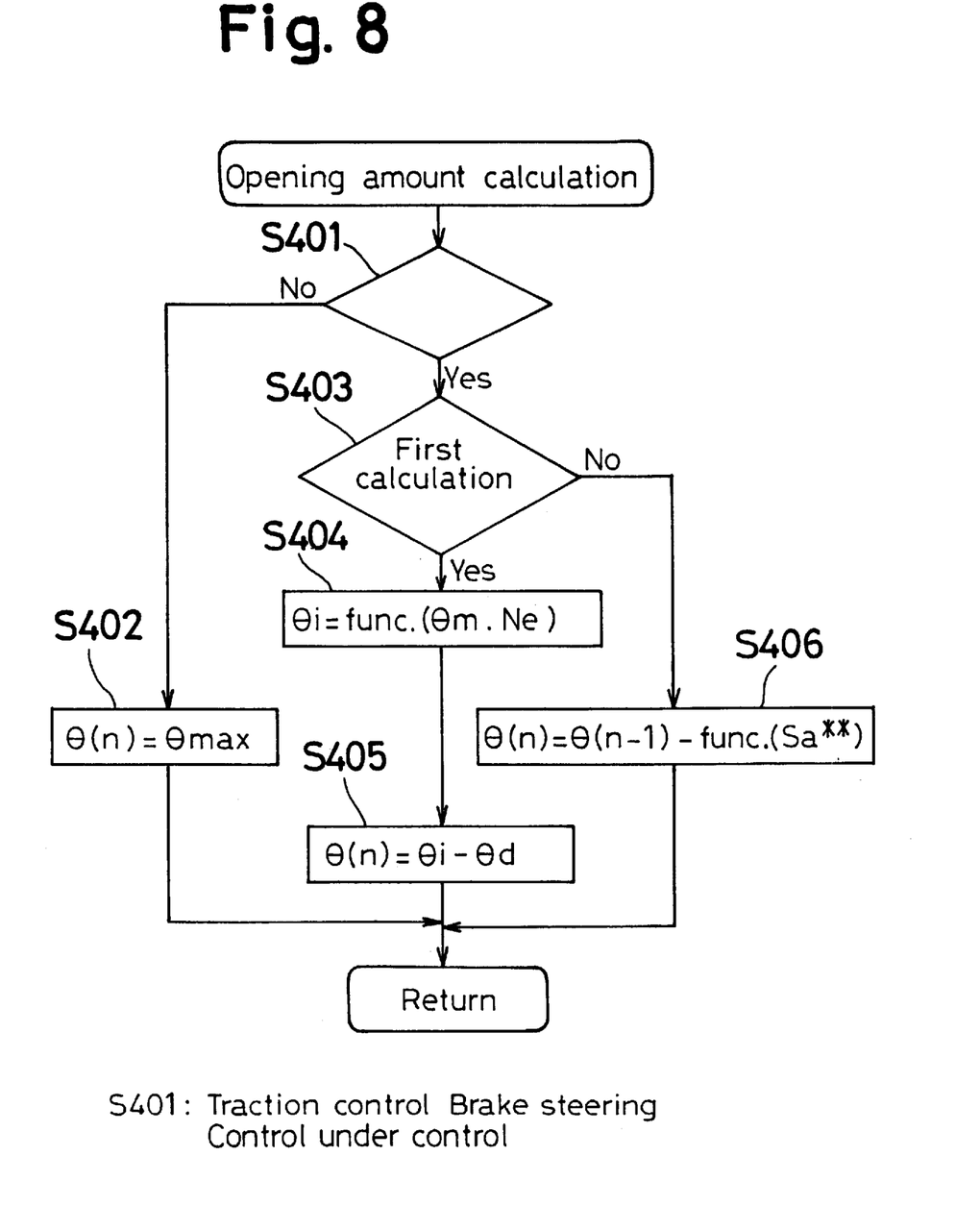
FIG. 8 is a flowchart showing details of a step S202 of FIG. 6.

FIG. 8 shows a process the calculation of the opening amount θ of the sub throttle valve ST in FIG. 6. In Step S401, it is judged whether the traction control or brake steering control is under control. When the traction control or the brake steering control is not under control, the opening amount of the sub throttle valve θ(n) is set to max value in Step S402 and the Step S114 in FIG. 5 is performed. When the traction, control or the brake steering control is under control, it is judged whether the calculation is a first calculation in Step S403. When the calculation is a first calculation, an initial opening amount θl of the sub throttle valve is obtained at a function of the main throttle opening amount θm and the rotational number of the engine Ne in Step S404. Then, in Step S405, the opening amount of the sub throttle valve is obtained as follows.

$$\theta(n) = \theta i - \theta d$$

Then, the Step S114 in FIG. 5 is performed, in the above description, (n) means the times of calculation and θ(n) means a present calculated value.

When the calculation is not a first calculation, in the Step S406, the opening amount θ(n) is renewed to a value which is obtained by adding an increase or decrease amount obtained as a function of the actual slip ration Sa** of the wheel to be controlled to the previous calculation valve θ(n−1). Then, the Step S114 in FIG. 5 is performed.

Figure 9:
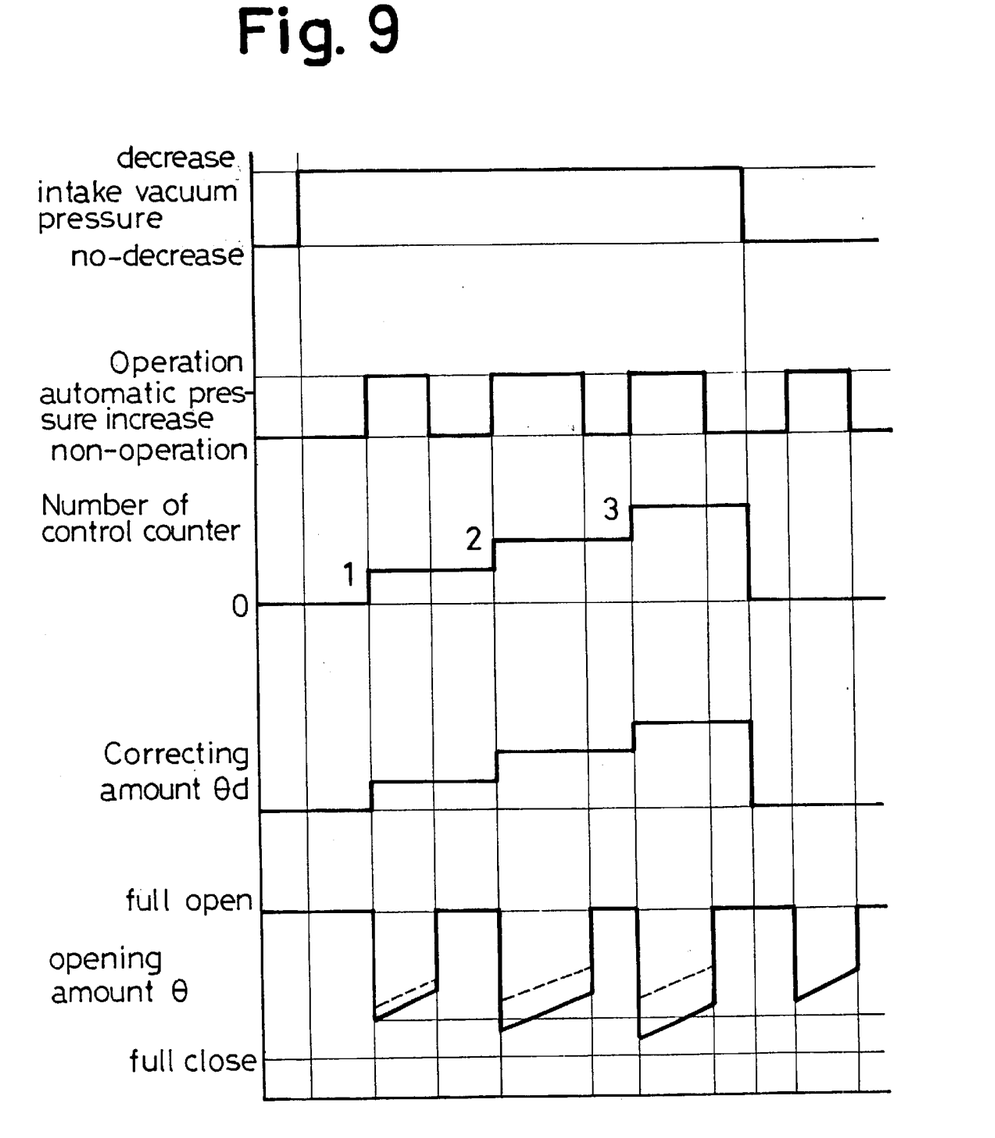
FIG. 9 is a timing chart showing an operation of the embodiment of the present invention.

FIG. 9 is a time chart showing the operation of this embodiment. In FIG. 9, dotted line of the opening amount θ shows a case in which the opening amount of the sub throttle valve ST is not corrected with the correcting amount θd. As shown in FIG. 9, in the condition that the intake vacuum pressure of the engine EG is decreased, the sub throttle opening amount is corrected so as to decrease the opening amount in accordance with the number of performance of the automatic pressure increase control. Therefore, even if the automatic pressure increase control is performed intermittently at relative shorter intervals, the vacuum pressure in the constant pressure chamber B2 of the vacuum booster VB is prevented from decreasing. Further, it is prevented that the brake hydraulic pressure which the automatic hydraulic pressure generator can generate is decreased and that the performance of the vehicle motion control device decreases. Further, the increase of a brake operational force which is required for normal braking is avoided.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle motion control device comprising:

a wheel cylinder equipped on a vehicle wheel;

an automatic hydraulic pressure generator generating a brake hydraulic pressure irrespective of the operation of a brake pedal by using an intake vacuum pressure of an engine of a vehicle;

a hydraulic pressure control valve disposed between the wheel cylinder and the automatic hydraulic pressure generator;

a throttle opening amount automatic adjusting means for adjusting automatically the opening amount of a throttle valve of the engine irrespective of the operation of an accelerator pedal of the vehicle;

control means for controlling the automatic hydraulic pressure generator and the hydraulic pressure control valve in accordance with a running condition of the vehicle and for performing an automatic pressure increase control to the wheel cylinder at least in a non-operating condition of the brake pedal, the control means for controlling the throttle opening amount automatic adjusting means in accordance with the running condition of the vehicle and for performing an opening amount automatic adjust control to the wheel cylinder;

intake vacuum pressure decrease condition detecting means for detecting a decrease condition of the intake vacuum pressure; and counter means for counting the number of times the automatic pressure increase control is performed under the intake vacuum pressure decrease condition detected by the intake vacuum pressure decrease condition detecting means, wherein the control means corrects the throttle opening amount requested to the throttle opening amount automatic adjusting means at the automatic pressure increase control to decrease the throttle opening amount in accordance with the number of times the automatic pressure increase control is performed as counted by the counter means.

2. The vehicle motion control device according to claim 1, wherein the automatic hydraulic pressure generator includes a master cylinder, a vacuum booster, and a booster actuator which operates the vacuum booster irrespective of the operation of a brake pedal.

3. The vehicle motion control device according to claim 1, wherein the control means increases a correcting amount pro rata so that the greater the number of times the automatic pressure increase control is performed the greater the correcting amount.

* * * * *